US007238432B2

(12) United States Patent
Haketa

(10) Patent No.: US 7,238,432 B2
(45) Date of Patent: Jul. 3, 2007

(54) METAL MEMBER COATED WITH METAL LAYERS

(75) Inventor: Naoki Haketa, Honjo (JP)

(73) Assignee: Dowa Mining Co., Ltd., Tokyo (JP)

(*) Notice: Subject to any disclaimer, the term of this patent is extended or adjusted under 35 U.S.C. 154(b) by 0 days.

(21) Appl. No.: 10/916,044

(22) Filed: Aug. 10, 2004

(65) Prior Publication Data

US 2005/0048309 A1 Mar. 3, 2005

(30) Foreign Application Priority Data

Aug. 25, 2003 (JP) ............................ 2003-208560

(51) Int. Cl.
  *B32B 15/00* (2006.01)
  *H01H 1/023* (2006.01)
  *H01R 13/03* (2006.01)
(52) U.S. Cl. ................... 428/672; 428/680; 428/926; 428/929; 439/886; 200/269
(58) Field of Classification Search ........... 428/680, 428/670, 672, 673, 675, 929, 926
  See application file for complete search history.

(56) References Cited

U.S. PATENT DOCUMENTS 4,626,479 A * 12/1986 Hosoi et al. ............... 428/663

5,066,550 A * 11/1991 Horibe et al. .............. 428/670
5,486,721 A * 1/1996 Herklotz et al. ........... 257/666
6,791,818 B1 * 9/2004 Shimoyama et al. ....... 361/302

FOREIGN PATENT DOCUMENTS

| JP | 54-110470 | * | 8/1979 |
| JP | 02-173289 | * | 7/1990 |
| JP | 3-229891 | | 10/1991 |
| JP | 05-299534 | * | 11/1993 |
| JP | 9-252070 | | 9/1997 |
| JP | 10-032378 | * | 2/1998 |
| JP | 2003-037355 | * | 2/2003 |
| JP | 2003-253454 | * | 9/2003 |

* cited by examiner

*Primary Examiner*—John J. Zimmerman
(74) *Attorney, Agent, or Firm*—Bachman & LaPointe, P.C.

(57) ABSTRACT

There is provided a metal member capable of realizing a corrosion resistance and wear resistance, which are equivalent to or better than those when expensive PdNi is used even if PdNi is not used, and of being produced at relatively low costs. A first layer essentially consisting of nickel and unavoidable impurities is formed on the surface of a base metal member. On the first layer, a second layer essentially consisting of nickel, phosphorus and unavoidable impurities is formed. On the second layer, a third layer essentially consisting of a noble metal or an alloy thereof is formed. The second layer contains 10 to 15 wt % of phosphorus. The thickness of the first layer is 3 μm or more, and the thickness of the second layer is 0.1 μm or more.

3 Claims, 1 Drawing Sheet

METAL MEMBER COATED WITH METAL LAYERS

BACKGROUND OF THE INVENTION

1. Field of the Invention

The present invention generally relates to a metal member coated with metal layers. More specifically, the invention relates to a metal member coated with metal layers to be used as an electronic member, an electric member, a mechanical member, a semiconductor member, a magnetic member, a member required to have excellent environment resistances, such as chemical resistance to acid and alkali, heat resistance and corrosion resistance, or a decorative member.

2. Description of the Prior Art

Conventionally, as a method for coating the surface of an underlying base metal member to improve various characteristics, such as electric contact resistance, solder wettability, wear resistance, mechanical strength, lubricity, environment resistance, chemical resistance, and decorative characteristics such as gloss, of the surface of the metal member, there has been widely carried out a plating process capable of obtaining high performance characteristics at relatively low costs.

In a typical plating process, a base metal material and a coating metal material are suitably selected to obtain desired characteristics. In particular, in order to combine materials having various excellent characteristics with respect to electric contact resistance, solder wettability, wear resistance, mechanical strength, lubricity, environment resistance, chemical resistance, and decorative characteristics such as gloss, at low costs, there has been carried out a method for electroplating a base metal material with an intermediate layer of a metal and further electroplating it with one selected from the group consisting of noble metals, such as Au, Ag, Pd and Rh, alloys containing them as principal components, Sn, Cu and Cr, and alloys containing them.

In particular, as a connector member having excellent wear resistance, mechanical strength, lubricity, environment resistance and so forth, there has been widely used a connector member wherein a base material is coated with relatively inexpensive Ni or an Ni alloy as a metal of an intermediate layer to be further coated with a noble metal.

As a connector member desired to have a high corrosion resistance and durability, there has been developed a connector member wherein an intermediate layer of Ni is coated with PdNi having an excellent corrosion resistance and wear resistance to be further plated with Au. In such a connector material having a high corrosion resistance and durability, the thickness of the Au layer is usually set in the range of 0.05 to 0.2 μm, which is required to decrease contact resistance at the minimum, in order to reduce costs by decreasing the amount of gold.

On the other hand, there is known a surface processing method for forming an electroless plating layer of an Ni—P alloy on the surface of a metal material, forming an electrolytic plating layer of an Ni—P alloy thereon, and forming a finishing plating layer thereon (see, e.g., Japanese Patent Laid-Open No. 3-229891). There is also known a lead frame which is produced by forming an Ni or Ni alloy plating layer on a lead frame base material, forming an Ni—P, Ni—B or Ni—Co alloy plating layer thereon, and forming an Au plating layer thereon (see, e.g., Japanese Patent Laid-Open No. 9-252070).

In recent years, it is desired to further reduce the cost of producing electronic materials. However, in the above described connector material wherein the Ni intermediate layer coated with PdNi is plated with Au, if the thickness of the Au plating layer is further decreased in order to reduce costs, there is a problem in that environment resistance is considerably deteriorated. In addition, if the Ni layer serving as the intermediate layer is simply thickened in order to reduce costs, the noble metal surface layer must be thickened since Ni is soft and has a low wear resistance and an insufficient corrosion resistance, so that costs are finally increased.

Therefore, the inventors have studied to replace PdNi, which is the second most expensive element after Au, with another inexpensive metal. However, if the NiP layer is used as the intermediate layer as described in Japanese Patent Laid-Open Nos. 3-229891 and 9-252070, although NiP is hard and has a higher wear resistance than that of Ni, there are disadvantages in that the deposition rate of NiP is far lower than that of Ni and that equipment costs are high when the thickness of the NiP layer is increased. In addition, if the NiP layer is used as a single underlayer, the corrosion resistance is insufficient, so that the noble metal surface layer must be similarly thickened to increase costs. Moreover, if the alloy plating described in Japanese Patent Laid-Open No. 9-252070 that the solder wettability can be improved is applied directly to a connector material to sequentially form an Ni alloy plating layer having a thickness of 1 μm, an Ni—P alloy plating layer having a thickness of 0.02 to 0.3 μm and an Au plating layer having a thickness of 0.1 μm, it is not possible to obtain a desired corrosion resistance although it is possible to improve wear resistance.

SUMMARY OF THE INVENTION

It is therefore an object of the present invention to eliminate the aforementioned problems and to provide a metal member coated with metal layers, which can realize a corrosion resistance and wear resistance equal to or higher than those when expensive PdNi is used even if PdNi is not used and which can be produced at low costs.

In order to accomplish the aforementioned and other objects, after the inventors have diligently studied and examined various inexpensive alternative metals, the inventors have found that it is possible to provide a metal member coated with metal layers, which can realize a corrosion resistance and wear resistance equal to or higher than those when expensive PdNi is used and which can be produced at low costs, even if the thickness of an Au surface layer is in the range of 0.05 to 0.2 μm if an intermediate layer of an Ni—P alloy having a thickness of 0.1 μm or more is formed on an underlayer of Ni having a thickness of 3 μm or more. Thus, the inventors have made the present invention.

According to one aspect of the present invention, a metal member comprises: a base metal member; a first layer formed on a surface of the base metal member, the first layer essentially consisting of nickel and unavoidable impurities; a second layer formed on the first layer, the second layer essentially consisting of nickel, phosphorus and unavoidable impurities; and a third layer formed on the second layer, the third layer essentially consisting of a noble metal or an alloy thereof, wherein the first layer having a thickness of 3 μm or more, and the second layer has a thickness of 0.1 μm or more.

According to another aspect of the present invention, a metal member comprises: a base metal member; a first layer formed on a surface of the base metal member, the first layer essentially consisting of nickel and unavoidable impurities; a second layer formed on the first layer, the second layer essentially consisting of nickel, phosphorus and unavoidable impurities; and a third layer formed on the second layer, the third layer essentially consisting of a noble metal or an alloy thereof, wherein the first layer having a thickness of 2 μm or more, and the second layer has a thickness of 0.3 μm or more.

In the above described metal member, the second layer preferably contains 10 wt % or more of phosphorus, and more preferably contains 10 to 15 wt % of phosphorus. In addition, the third layer preferably essentially consists of gold or a gold alloy. In this case, the thickness of the third layer is preferably in the range of from 0.05 to 0.2 μm.

DESCRIPTION OF THE PREFERRED EMBODIMENTS

In a preferred embodiment of a metal member coated with metal layers according to the present invention, an intermediate layer of an Ni—P alloy layer having a thickness of 0.1 μm is formed on an Ni layer having a thickness of 3 μm or more. Thus, it is possible to obtain a good corrosion resistance and wear resistance even if the thickness of an Au surface layer is in the range of from 0.05 to 0.2 μm, which is the minimum thickness range to obtain a good contact resistance.

Figure 1:
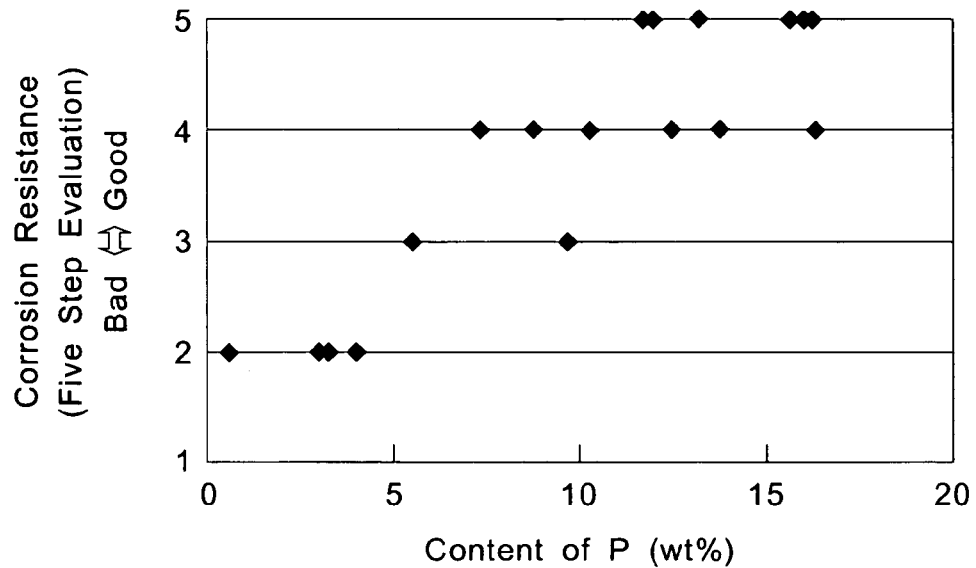
FIG. 1 is a graph showing the relationship between the content of P in an Ni—P alloy and the corrosion resistance thereof.
Figure 2:
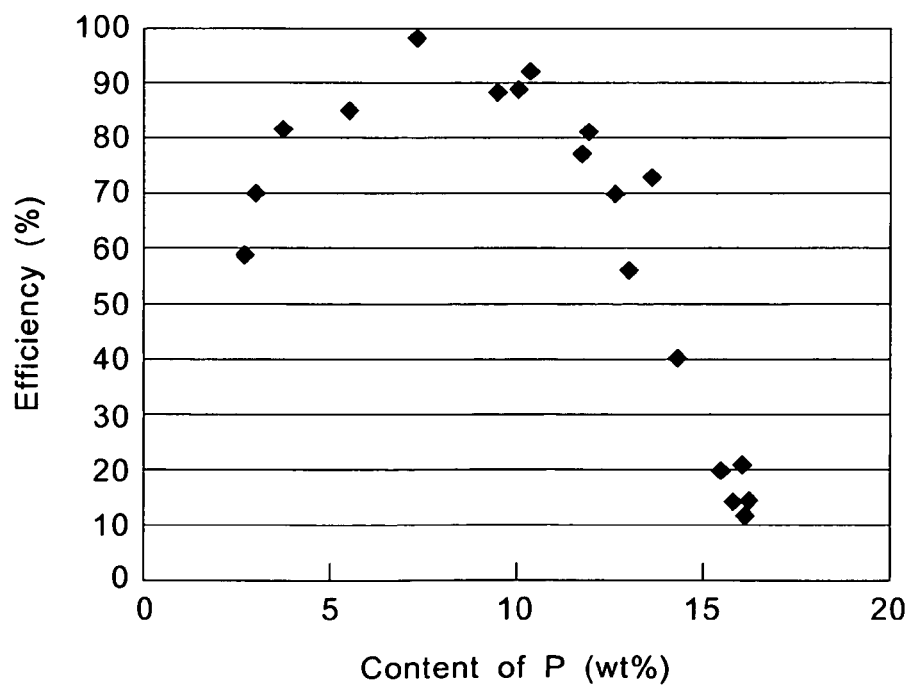
FIG. 2 is a graph showing the relationship between the content of P in an Ni—P alloy and the plating efficiency thereof.

After the relationship between the content of P in an Ni—P alloy and the corrosion resistance thereof was examined, it was found as shown in FIG. 1 that the corrosion resistance was improved with the increase of the content of P in the Ni—P alloy and that it was possible to obtain a satisfied corrosion resistance when the content of P exceeded about 10 wt %. On the other hand, after the relationship between the content of P in an Ni—P alloy and the plating efficiency thereof was examined, it was found as shown in FIG. 2 that the plating efficiency decreased after the content of P exceeded about 10 wt % and that the plating efficiency was about 20% when the content of P exceeded 15 wt %, so that such an efficiency was of no practical use. In addition, the wear resistance of the Ni—P alloy does not greatly vary even if the content of P varies. Therefore, the content of P in the Ni—P alloy is preferably in the range of 10 to 15 wt %.

If an electrolytic method is selected as a method for depositing an intermediate layer of an Ni—P alloy, the corrosion resistance is improved.

Examples of a metal member coated with metal layers according to the present invention will be described below in detail.

EXAMPLES 1 THROUGH 6

By the electroplating method, an Ni layer having a thickness shown in Table was deposited in a region of 50 mm×60 mm on a copper substrate having a size of 60 mm×60 mm×0.3 mm, and an NiP layer having a thickness shown in Table was deposited thereon. Then, by the electroplating method, an AuCo layer having a thickness of 0.1 μm was deposited thereon to produce a metal member coated with metal layers. The corrosion resistance and wear resistance of the metal member coated with metal layers thus produced were evaluated.

The pretreatment and plating conditions for producing the metal member coating with metal layers will be described below.

(Pretreatment)

First, a copper substrate was immersed in an alkali degreasing solution, and a voltage of 5 V was applied thereto for two minutes. Thereafter, the copper substrate was taken out of the degreasing solution to be washed with pure water. Then, the copper substrate was immersed in a 5% aqueous sulfuric acid solution for thirty minutes. Thereafter, the copper substrate was taken out of the aqueous sulfuric acid solution to be washed with pure water again.

(Ni Plating)

The copper substrate thus pretreated and an Ni electrode plate were immersed in a plating bath, which includes nickel sulfamate (the content of Ni was 100 g/L), nickel chloride (the content of Ni was 15 g/L), boric acid (30 g/L) and a brightening agent (leveling agent), to be connected to a negative electrode and a positive electrode, respectively. Then, at a set current density of be 5.0 A/dm$^2$, the copper substrate was coated with an Ni plating layer having a thickness shown in Table. Furthermore, in the deposition of the Ni plating, a stirrer was rotated at 300 rpm to stir the plating bath, and the bath was held at a temperature of 50° C.

(Ni—P Plating)

As an Ni—P plating bath, there was used a plating bath which contains nickel sulfate (200 g/L), sodium hypophosphite (20 g/L), boric acid (20 g/L), sodium chloride (20 g/L) and phosphoric acid (5 mL). The bath was held at a temperature of 70° C. and at a pH of 2.3. Then, the copper substrate plated with Ni and washed, and an Ni electrode plate were immersed in the bath to be connected to a negative electrode and a positive electrode, respectively. Then, the copper substrate plated with Ni was plated with an Ni—P layer having a thickness shown in Table. Furthermore, in the deposition of the Ni—P plating, a stirrer was rotated at 300 rpm to stir the plating bath, and the bath was held at a temperature of 70° C.

(AuCo Plating)

As a plating bath, a cyanogen bath (Aurobright HS-5 produced by Nippon Kojundo Kagaku Co., Ltd.) was used. That is, the plating bath was prepared by putting 1.3 L pure water in a tank, raising the temperature in the tank to 50° C., dissolving therein a salt for initial make-up of electrolytic bath (Aurobright BA) and an additive for initial make-up of electrolytic bath (Aurobright BB), adding pure water thereto to obtain a total volume of 2 L, adding Aurobright pH adjusting agent thereto so as to obtain a pH of 4.0, and adding 6 g/L of potassium gold cyanide thereto as a gold concentration. The copper substrate plated with Ni and Ni—P, and an electrode plate of Ti coated with platinum were immersed in the plating bath to be connected to a negative electrode and a positive electrode, respectively. Then, a current of 0.72 A was caused to pass through the plating bath for thirty minutes to plate the copper substrate with an AuCo alloy layer having a thickness of 0.1 μm. Furthermore, in the deposition of the AuCo alloy layer, a stirrer was rotated at 300 rpm to stir the plating bath, and the bath was held at a temperature of 50° C.

After the copper substrate thus plated was washed with pure water, air was sprayed to dry the substrate.

The corrosion resistance and wear resistance of the copper substrate thus plated as a test piece were evaluated. The corrosion resistance was evaluated by carrying out a nitric acid aeration test based on JIS H8616 with respect to the test piece (leaving the test piece in nitric acid vapor at 25° C. for two hours) and by evaluating the degree of corrosion on the surface before and after the aeration test. The wear resistance was evaluated as follows. A SUS indenter having a spherical tip having a diameter of 5 mm was stood on the test piece perpendicularly thereto, and a load of 50 g was applied in an axial direction of the indenter. In this state, the pin tip was reciprocated on the same trajectory on the surface of the test piece to scratch the test piece. At that time, the pin tip was reciprocated at a frequency of 1.0 Hz (60 cycles/minute) by a constant reciprocating distance (12.5 mm), and the friction width of the test piece was measured to evaluate the wear resistance. As the friction width is smaller, the wear resistance is more excellent. In this evaluation, the friction width of a sample using an intermediate layer of PdNi was used as a reference friction width. If the friction width was narrower than the reference friction width, the wear resistance was evaluated to be good, and if the friction width was wider than the reference friction width, the wear resistance was evaluated to be bad. The results of evaluation of the test pieces are shown in Table.

TABLE

| | Thickness of Plating Layer (μm) | | | Corrosion Resistance | Wear Resistance |
|---|---|---|---|---|---|
| | Undercoat (Ni) | Intermediate (NiP) | Surface (Au) | | |
| Comp. 1 | 1 | 0.05 | 0.1 | bad | very good |
| Comp. 2 | 1 | 0.1 | 0.1 | bad | very good |
| Comp. 3 | 1 | 0.3 | 0.1 | bad | very good |
| Comp. 4 | 1 | 0.5 | 0.1 | bad | very good |
| Comp. 5 | 2 | 0.05 | 0.1 | bad | very good |
| Comp. 6 | 2 | 0.1 | 0.1 | bad | very good |
| Ex. 1 | 2 | 0.3 | 0.1 | good | very good |
| Ex. 2 | 2 | 0.5 | 0.1 | good | very good |
| Ex. 3 | 2 | 1 | 0.1 | good | very good |
| Comp. 7 | 3 | 0.05 | 0.1 | bad | very good |
| Ex. 4 | 3 | 0.1 | 0.1 | very good | very good |
| Ex. 5 | 3 | 0.3 | 0.1 | very good | very good |
| Ex. 6 | 3 | 0.5 | 0.1 | very good | very good |
| Comp. 8 | 3 | — | 0.1 | bad | bad |
| Comp. 9 | — | 0.1 | 0.1 | bad | bad |
| Comp. 10 | — | 0.5 | 0.1 | bad | bad |
| Comp. 11 | — | 1 | 0.1 | bad | very good |
| Comp. 12 | — | 2 | 0.1 | bad | very good |
| Comp. 13 | — | 3 | 0.1 | bad | very good |
| Comp. 14 | — | 4 | 0.1 | bad | very good |
| Comp. 15 | — | 5 | 0.1 | good | very good |
| Comp. 16 | 3 | (PdNi) 0.05 | 0.1 | good | — |
| Comp. 17 | 3 | (PdNi) 0.5 | 0.1 | very good | — |

COMPARATIVE EXAMPLES 1 THROUGH 7

Test pieces were produced by the same method as that in Examples, except that the thickness of Ni plating layers and Ni—P plating layers was changed as shown in Table. Then, the corrosion resistance and wear resistance of the test pieces were evaluated by the same method as that in Examples. The results of evaluation of the test pieces are shown in Table.

COMPARATIVE EXAMPLE 8

A test piece was produced by depositing an Ni layer having a thickness of 3 μm and depositing an AuCo layer having a thickness of 0.1 μm thereon, by the same method as that in Examples, except that the Ni—P plating layer was not formed as the intermediate layer. Then, the corrosion resistance and wear resistance of the test piece were evaluated by the same method as that in Examples. The results of evaluation of the test piece are shown in Table.

COMPARATIVE EXAMPLES 9 THROUGH 15

Test pieces were produced by changing the thickness of the Ni—P layer to 0.1, 0.5, 1, 2, 3, 4 and 5 μm, by the same method as that in Examples, except that the Ni plating layer was formed as the underlayer. Then, the corrosion resistance and wear resistance of the test pieces were evaluated by the same method as that in Examples. The results of evaluation of the test pieces are shown in Table.

COMPARATIVE EXAMPLES 16 AND 17

Comparative Example 17 is a typical example of a conventional plating structure using PdNi for improving corrosion resistance and wear resistance. In this comparative example, a test piece was produced by forming an Ni plating layer having a thickness of 3 μm as an underlayer, a PdNi plating layer having a thickness of 0.5 μm as an intermediate layer, and an AuCo plating layer having a thickness of 0.1 μm as an outermost surface layer. In Comparative Example 16, a test piece was produced by the same method as that in Comparative Example 17, except that the thickness of the PdNi plating layer was 0.05 μm. These test pieces were evaluated by the same method as that in Examples. The results of evaluation are shown in Table.

As can be seen from Table, in Comparative Examples 1 through 7, i.e., in a case where the thickness of the Ni plating layer was 1 μm, in a case where the thickness of the Ni plating layer was 2 μm and the thickness of the Ni—P plating layer was 0.1 μm or less, and in a case where the thickness of the Ni plating layer was 3 μm and the thickness of the Ni—P plating layer was 0.05 μm or less, it was possible to obtain a satisfied corrosion resistance. In Comparative Example 8 wherein only the Ni plating layer was used as the underlayer, both of the corrosion resistance and wear resistance were inferior to those in Examples. In Comparative Examples 9 through 15, it was not possible to obtain a sufficiently satisfied corrosion resistance even if the thickness of the Ni—P plating layer was 5 μm (Comparative Example 15). In Examples 4 through 6, both of the corrosion resistance and wear resistance were equivalent to or better than those in Comparative Example 17 (conventional example). In Examples 1 through 3, the corrosion resistance was not very good and was equivalent to that in Comparative Example 16 wherein the thickness of the PdNi plating layer was 0.05 μm, but the wear resistance was excellent.

While the thickness of the Au plating layer on the outermost surface was 0.1 μm in Examples, it was possible to substantially obtain the same results when the thickness of the Au plating layer was in the range of from 0.05 to 0.2 μm.

Furthermore, the cost of producing the Ni—P plating can be about one-tenth the cost of producing the PdNi plating having the same thickness. Therefore, in Examples, it is possible to provide a metal member coated with metal layers, which can realize a corrosion resistance and wear resistance, which are equivalent to or better than those when PdNi is used, and which can be produced at relatively low costs.

As described above, according to the present invention, even if expensive PdNi is not used, it is possible to provide a metal member coated with metal layers, which can realize a corrosion resistance and wear resistance, which are equivalent to or better than those when PdNi is used, and which can be produced at relatively low costs.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A metal member comprising:
   a base metal member;
   a first layer formed on a surface of said base metal member, said first layer essentially consisting of nickel and unavoidable impurities and having a thickness of 3 µm or more;
   a second layer formed on said first layer, said second layer essentially consisting of nickel, phosphorus and unavoidable impurities and having a thickness of 0.1 µm or more; and
   a third layer formed as an outermost surface layer on said second layer, said third layer essentially consisting of AuCo and having a thickness of 0.05 to 0.2 µm,
   wherein said second layer contains 10 wt % or more of phosphorus.

2. A metal member comprising:
   a base metal member;
   a first layer formed on a surface of said base metal member, said first layer essentially consisting of nickel and unavoidable impurities and having a thickness of 2 µm or more;
   a second layer formed on said first layer, said second layer essentially consisting of nickel, phosphorus and unavoidable impurities and having a thickness of 0.3 µm or more; and
   a third layer formed as an outermost surface layer on said second layer, said third layer essentially consisting of AuCo and having a thickness of 0.05 to 0.2 µm,
   wherein said second layer contains 10 wt % or more of phosphorus.

3. A metal member as set forth in claim 1 or 2, wherein said second layer contains 10 to 15 wt % of phosphorus.

* * * * *